(12) United States Patent
Lee et al.

(10) Patent No.: US 12,218,302 B2
(45) Date of Patent: Feb. 4, 2025

(54) RECHARGEABLE BATTERY AND PACK OF THE SAME

(71) Applicant: SAMSUNG SDI CO., LTD., Yongin-si (KR)

(72) Inventors: Hyun-Soo Lee, Yongin-si (KR); Jeong-Won Oh, Yongin-si (KR); Sang-Shin Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 92 days.

(21) Appl. No.: 17/402,423

(22) Filed: Aug. 13, 2021

(65) Prior Publication Data

US 2021/0376430 A1 Dec. 2, 2021

Related U.S. Application Data

(62) Division of application No. 14/948,018, filed on Nov. 20, 2015, now Pat. No. 11,095,005.

(30) Foreign Application Priority Data

Jan. 14, 2015 (KR) ........................ 10-2015-0006990

(51) Int. Cl.
*H01M 50/553* (2021.01)
*H01M 10/04* (2006.01)
(Continued)

(52) U.S. Cl.
CPC ... *H01M 10/0431* (2013.01); *H01M 10/0413* (2013.01); *H01M 10/045* (2013.01);
(Continued)

(58) Field of Classification Search
None
See application file for complete search history.

(56) References Cited

U.S. PATENT DOCUMENTS 7,998,613 B2  8/2011  Jeon et al.
2004/0166406 A1  8/2004  Higuchi et al.
(Continued)

FOREIGN PATENT DOCUMENTS

CN  102195012 A  9/2011
CN  104078631 A  10/2014
(Continued)

OTHER PUBLICATIONS

Chinese Office Action, with English translation, dated Feb. 2, 2019, for corresponding Chinese Patent Application No. 201610007110.X (19 pages).

(Continued)

*Primary Examiner* — Haixia Zhang
(74) *Attorney, Agent, or Firm* — Lewis Roca Rothgerber Christie LLP

(57) ABSTRACT

An aspect of the present invention provides a rechargeable battery which makes placement of the electrode assembly in the case during assembly easy. The rechargeable battery includes an electrode assembly including a first electrode, a separator, and a second electrode, a case housing the electrode assembly and having an opening in a plane parallel to a flat side surface of the electrode assembly, the case being electrically connected to the first electrode, a cover closing the opening in the case, and an electrode terminal mounted to a terminal opening in the case and connected to the second electrode, wherein the electrode terminal and the second electrode are insulated from the case.

4 Claims, 8 Drawing Sheets

(51) Int. Cl.
- *H01M 50/103* (2021.01)
- *H01M 50/209* (2021.01)
- *H01M 50/507* (2021.01)
- *H01M 50/516* (2021.01)
- *H01M 50/536* (2021.01)
- *H01M 50/55* (2021.01)

(52) U.S. Cl.
CPC ....... *H01M 50/103* (2021.01); *H01M 50/209* (2021.01); *H01M 50/507* (2021.01); *H01M 50/516* (2021.01); *H01M 50/536* (2021.01); *H01M 50/55* (2021.01); *H01M 50/553* (2021.01); *H01M 2220/20* (2013.01); *H01M 2220/30* (2013.01)

(56) References Cited

U.S. PATENT DOCUMENTS

| | | | |
|---|---|---|---|
| 2007/0141458 A1* | 6/2007 | Nagatani | H01M 50/553 429/158 |
| 2010/0190050 A1* | 7/2010 | Ochi | H01M 50/293 429/160 |
| 2010/0216009 A1 | 8/2010 | Kim | |
| 2010/0279156 A1* | 11/2010 | Kim | H01M 50/572 429/82 |
| 2010/0310928 A1 | 12/2010 | Roh et al. | |
| 2011/0076521 A1* | 3/2011 | Shimizu | H01M 50/529 429/82 |
| 2011/0117426 A1 | 5/2011 | Choi et al. | |
| 2011/0223461 A1 | 9/2011 | Kim | |
| 2012/0121966 A1* | 5/2012 | Kim | H01M 50/512 429/158 |
| 2014/0038003 A1 | 2/2014 | Tsunaki et al. | |
| 2014/0295220 A1 | 10/2014 | Mori et al. | |

FOREIGN PATENT DOCUMENTS

| | | |
|---|---|---|
| DE | 10-2014-205662 A1 | 10/2014 |
| EP | 2330661 A1 | 6/2011 |
| EP | 2498318 A1 | 9/2012 |
| EP | 2736097 A2 | 5/2014 |
| JP | 10-112295 A | 4/1998 |
| JP | 2002-246003 A | 8/2002 |
| KR | 2003-0053092 A | 6/2003 |
| KR | 10-2004-0048295 A | 6/2004 |
| KR | 10-2005-0028722 A | 3/2005 |
| KR | 10-2007-0107921 A | 11/2007 |
| KR | 10-2010-0096755 A | 9/2010 |

OTHER PUBLICATIONS

Chinese Patent Second Office Action with English Translation for corresponding Chinese Patent Application No. 201610007110.X, dated Sep. 4, 2019, including the Search Report dated Aug. 27, 2019, 20 pages.

Chinese Office Action, with English translation, dated Dec. 18, 2019, for corresponding Chinese Patent Application No. 201610007110.X (18 pages).

EPO Extended Search Report dated Jun. 2, 2016, for corresponding European Patent Application No. 16150555.7 (6 pages).

EPO Office Action dated Jul. 7, 2017, for corresponding European Patent Application No. 16150555.7 (5 pages).

EPO Office Action dated Mar. 8, 2018, for corresponding European Patent Application No. 16150555.7 (5 pages).

Korean Office Action, dated Mar. 25, 2021, of the corresponding Korean Patent Application No. 10-2015-0006990, 7 pages.

* cited by examiner

RECHARGEABLE BATTERY AND PACK OF THE SAME

CROSS-REFERENCE TO RELATED APPLICATIONS

This application is a divisional of U.S. patent application Ser. No. 14/948,018, filed Nov. 20, 2015, which claims priority to and the benefit of Korean Patent Application No. 10-2015-0006990, filed Jan. 14, 2015, the entire content of both of which is incorporated herein by reference.

BACKGROUND

1. Field

This description relates to a rechargeable battery and a battery pack including the same.

2. Description of the Related Art

Unlike a primary battery, a rechargeable battery is designed for repeated charging and discharging. A small capacity rechargeable battery may be used in a small portable electronic device, such as a mobile phone, a laptop computer and a camcorder, and a large capacity rechargeable battery may be used as a power source of a motor in a hybrid vehicle or an electric vehicle.

As an example, a rechargeable battery may include an electrode assembly for charging and discharging, a case for housing the electrode assembly, a cap plate coupled to an opening in the case, and an electrode terminal outside of the cap plate.

The rechargeable battery is assembled as the electrode terminal is connected to the electrode assembly and mounted to the cap plate, and the cap plate is welded to the case after the electrode assembly is placed in the case. The case has an opening formed at a narrow (or small) side of a substantially rectangular shaped case, and the electrode assembly is placed in the case through the opening.

Therefore, when the electrode assembly is placed in the case, the electrode assembly may be damaged by the opening of the case. That is, safely placing the electrode assembly in the case during assembly of the secondary battery is difficult.

The above information disclosed in this Background section is only for enhancement of understanding of the background of the invention and therefore it may contain information that does not form prior art.

SUMMARY

The present invention provides a rechargeable battery and a pack of the same. The rechargeable battery includes an electrode assembly that may be easily placed in a case, wherein the battery pack may be easily assembled.

An aspect of the present invention provides a rechargeable battery which enables easy placement of an electrode assembly in a case. Another aspect of the present invention provides a rechargeable battery pack which may be easily assembled.

In accordance with one or more embodiments of the present invention, a rechargeable battery includes: an electrode assembly including a first electrode, a separator and a second electrode; a case housing the electrode assembly and having an opening in a plane parallel to a flat side surface of the electrode assembly, the case being electrically connected to the first electrode; a cover closing the opening in the case; and an electrode terminal electrically mounted to a terminal opening in the case and connected to the second electrode, wherein the electrode terminal and the second electrode are insulated from the case.

The first electrode, the separator, and the second electrode may be stacked and spirally wound.

The case may include a bottom for supporting a flat portion of the electrode assembly, the bottom being opposite to the opening, and a side wall extending from the bottom along a periphery of the bottom.

The side wall may include a first long side wall and a second long side wall parallel to the first long side wall, and a first short side wall and a second short side wall parallel to the first short side wall, the first short side wall and the second short side wall each connected to the first long side wall and the second long side wall, and the first long side wall may have a terminal opening formed therein.

The electrode assembly may have spirally-wound end portions that face the first short side wall and the second short side wall, respectively.

The rechargeable battery may further include a first lead tab connected to the first electrode of the electrode assembly and connected to an inside surface of the first long side wall by welding.

The first long side wall may further include a welding inducing portion protruded toward the first lead tab from an inside surface thereof and welded to the first lead tab.

The electrode terminal may include a plate terminal on an outside of the long side wall and aligned with the terminal hole, and a rivet terminal connected to the electrode assembly via a second lead tab extending through the terminal opening and fastened to the plate terminal.

The rechargeable battery may further include an insulating member between the plate terminal and one of the long side walls, and a gasket between the rivet terminal and the terminal opening.

The electrode assembly may have spirally-wound end portions facing the first long side wall.

The rechargeable battery may further include an insulating plate between the first long side wall and the electrode assembly, wherein the first electrode has an uncoated portion connected to an inside surface of the first long side wall via a first lead tab, and wherein the second electrode has an uncoated portion connected to the electrode terminal with a second lead tab.

The first long side wall may further include a welding inducing portion protruded toward the first lead tab from an inside surface of the first long side wall and welded to the first lead tab.

The electrode terminal may include a plate terminal on an outside of the first long side wall corresponding to the terminal opening, and a rivet terminal connected to the electrode assembly via a second lead tab, extending through the terminal opening, and fastened to the plate terminal.

The rechargeable battery may further include an insulating member between the plate terminal and the first long side wall, and a gasket between the rivet terminal and the terminal hole.

According to another aspect of the present invention, a rechargeable battery pack includes a plurality of unit cells, each one of the unit cells having an electrode assembly with a first electrode electrically connected to a case, the case having an opening in a plane parallel to a flat side surface of the electrode assembly and a second electrode electrically connected to an electrode terminal, the electrode terminal extending away from the case and insulated from the case, and a bus bar connected between the electrode terminal of a first unit cell of the unit cells and the case of a second unit cell of the unit cells, the electrode terminal of the first cell having a height that is different from a height of the case of the second unit cell.

The case may have a first long side wall, a second long side wall, a first short side wall and a second short side wall, each side wall connected to a bottom of the case, thereby forming the opening, the opening being opposite to the bottom, wherein the bus bar is connected to the first long side wall.

The bus bar may be connected to a bus bar connection recess recessed in the first long side wall of the case of the second unit cell.

The bus bar may be connected to the first long side wall of the case of the second unit cell by welding.

Because the rechargeable battery of the present invention has a wide opening in the case which intersects a plane parallel to a flat side surface of the electrode assembly, the electrode assembly may be placed in the case through the wide opening, making assembly of the rechargeable battery easy.

Because the rechargeable battery pack of the present invention has a bus bar having a height difference and connecting an electrode terminal of a first unit cell and the case of a second unit cell adjacent to the first unit cell, assembly of the pack may be easy.

DETAILED DESCRIPTION

Embodiments of the present invention are described more fully hereinafter with reference to the accompanying drawings, such that a person of ordinary skill in the relevant art can easily carry out the present invention. However, the present invention may be embodied in different modes, and is not limited to the description of embodiments made herein. Parts not relevant to the present invention may be omitted to enhance clarity of the disclosure, and throughout the specification, identical or similar parts have the same reference numbers.

Accordingly, the embodiments are described below as examples only, by referring to the figures, to explain aspects of the embodiments of the present invention. As used herein, the term "and/or" includes any and all combinations of one or more of the associated listed items. Expressions such as "at least one of," when preceding a list of elements, modify the entire list of elements and do not modify the individual elements of the list.

It will be understood by a person of ordinary skill in the art that, although the terms 'first' and 'second' are used herein to describe various elements, these elements should not be limited by these terms. Instead, these terms are only used to distinguish one element from another element. It will be further understood by a person of ordinary skill in the art that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the singular forms "a", "an" and "the" are intended to include the plural forms as well, unless the context clearly indicates otherwise.

Figure 1:
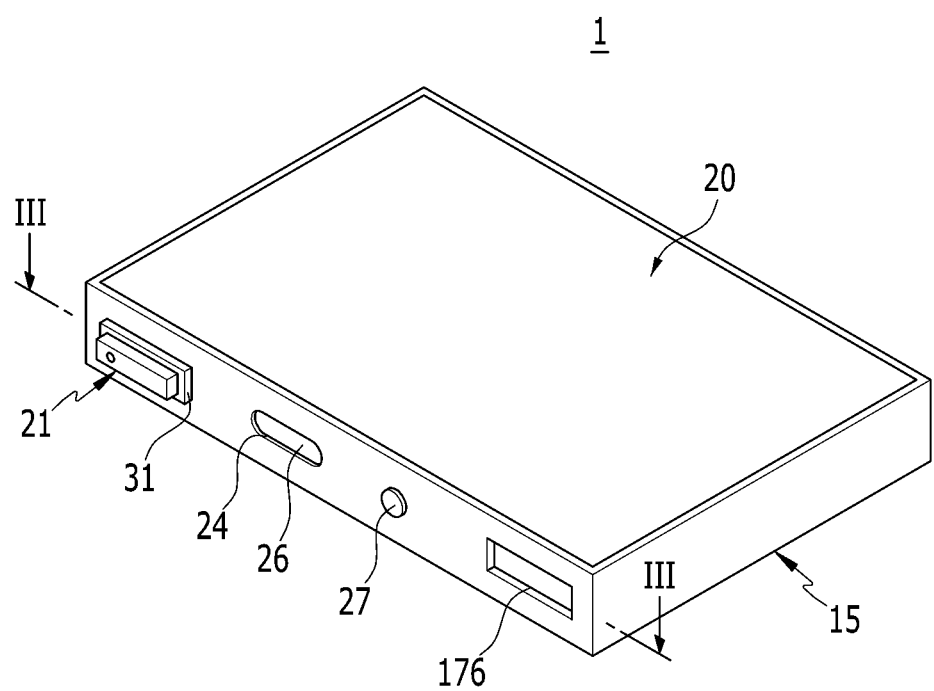
FIG. 1 is a perspective view of a rechargeable battery in accordance with a first embodiment of the present invention.
Figure 2:
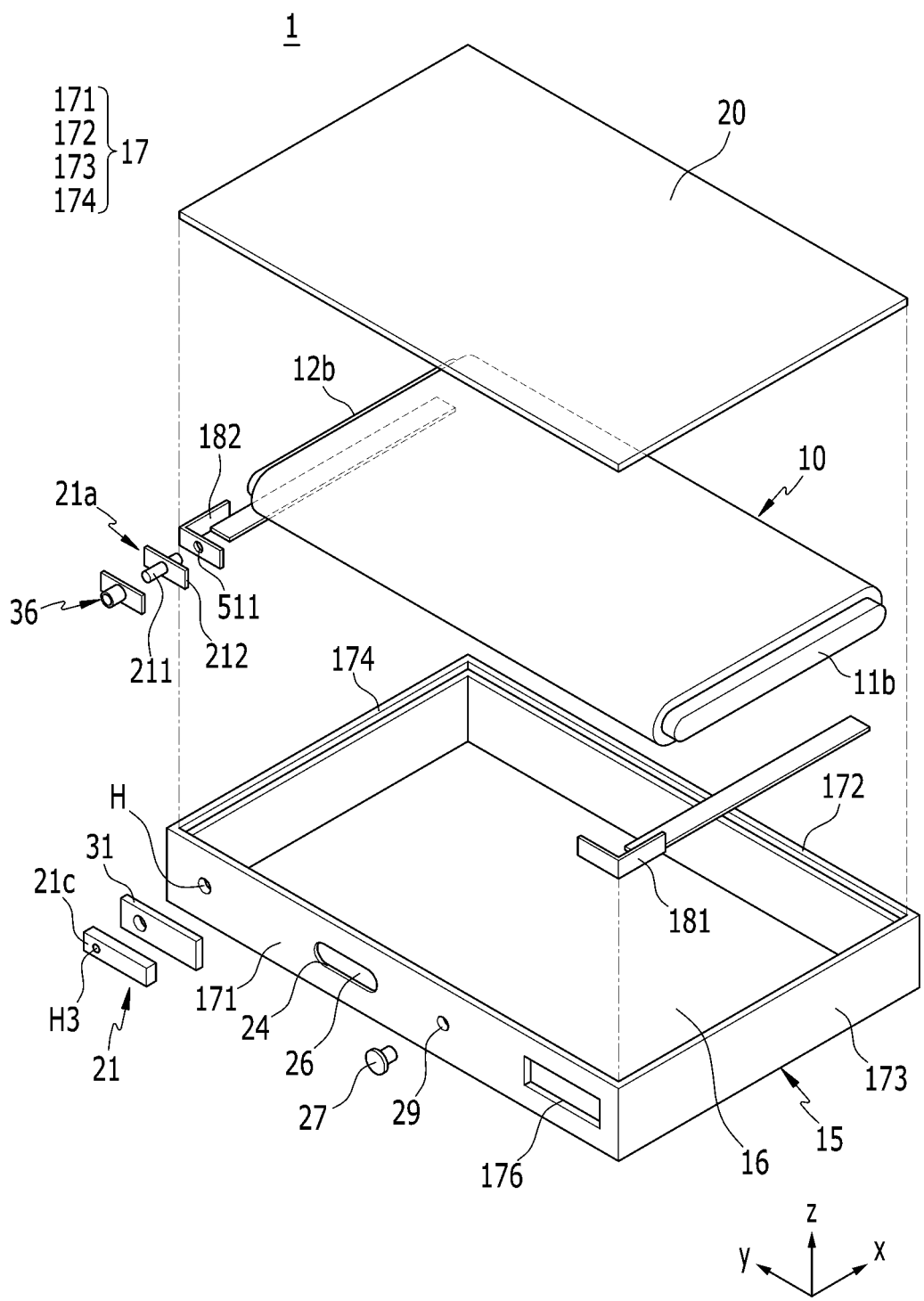
FIG. 2 is an exploded perspective view of the rechargeable battery of FIG. 1.

FIG. 1 is a perspective view of a rechargeable battery in accordance with a first embodiment of the present invention, and FIG. 2 is an exploded perspective view of the rechargeable battery of FIG. 1. Referring to FIGS. 1 and 2, a rechargeable battery 1 includes an electrode assembly 10 for charging and discharging a current, a case 15 for housing the electrode assembly 10 therein, and an electrode terminal 21 mounted in a terminal opening H (e.g., a terminal hole) in the case 15 and electrically connected to the electrode assembly 10.

Figure 3:
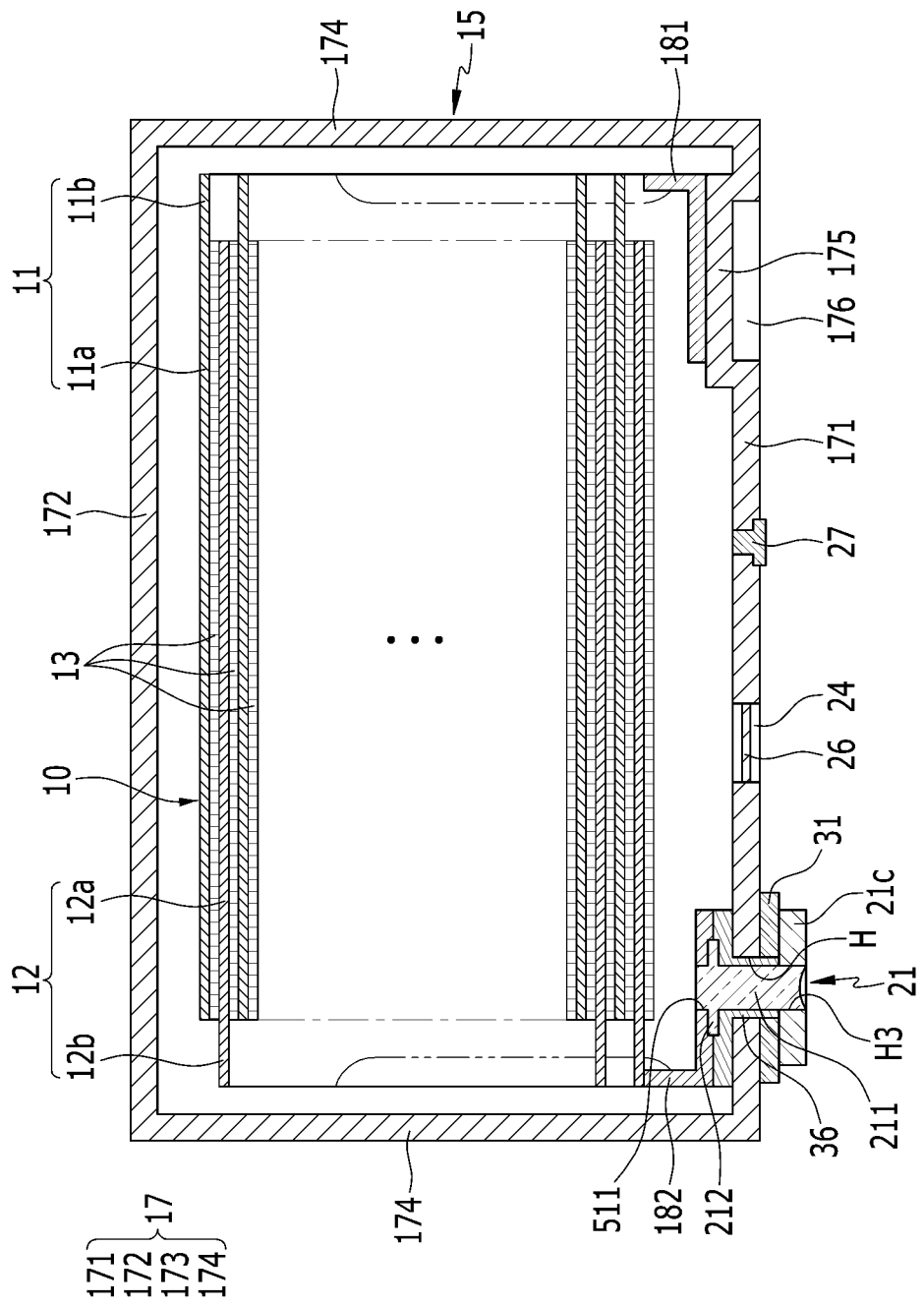
FIG. 3 is a cross-sectional view taken along the line III-III of FIG. 1.

FIG. 3 is a cross-sectional view taken along the line III-III of FIG. 1. Referring to FIGS. 2 and 3, the electrode assembly 10 has a tabular shape and is housed in the case 15. The electrode assembly 10 includes a first electrode 11 (also referred to herein as a "positive electrode") and a second electrode 12 (also referred to herein as a "negative electrode") arranged on either side of a separator 13 and spirally-wound in a jelly roll state. The separator 13 may be an insulator.

The positive and negative electrodes 11, 12 respectively include a coated portion 11a, 12a having an active material coated on a current collector of a metal foil (for example, an Al or Cu foil) and an uncoated portion 11b, 12b having no active material coated thereon thereby exposing the current collector.

The uncoated portion 11b of the positive electrode 11 is formed on a side end portion of the positive electrode 11 along the spirally-wound positive electrode 11. The uncoated portion 12b of the negative electrode 12 is formed on a side end portion of the negative electrode 12 along the spirally-wound negative electrode 12. The uncoated portions 11b and 12b are arranged on opposite sides of the electrode assembly 10, respectively.

The case 15 may have a substantially rectangular hexahedral shape having an open side (e.g., having an opening) to form a space for housing the electrode assembly 10. The opening in the case 15 is formed in a plane (e.g., a x-y plane) parallel to a flat side surface of the electrode assembly 10. That is, the opening is formed in a wide side of the case 15, as illustrated in FIG. 2.

Therefore, the electrode assembly 10 may be placed in the case 15 in a first direction (e.g., a z-axis direction) which intersects the first plane (or the x-y plane). As such, because the electrode assembly 10 is placed in the wide opening of the case 15, placement of the electrode assembly 10 in the case 15 becomes relatively easy.

The case 15 may have a bottom 16 for supporting a flat portion of the electrode assembly 10 on a side opposite to the rectangular opening and a side wall 17 having a height in the first direction (or the z-axis direction) and extending from an outside periphery of the bottom 16. The bottom 16 is formed in a rectangular shape and substantially matches (or corresponds to) the flat portion of the electrode assembly 10, and the side wall 17 substantially matches (or corresponds to) the height of the electrode assembly 10 in the first direction (or the z-axis direction).

The side wall 17 includes a first long side wall 171 and a second long side wall 172 parallel to the first long side wall 171 and a first short side wall 173 and a second short side wall 174 parallel to the second short side wall 173, the first short side wall 173 and the second short side wall 174 each connected to the first long side wall 171 and the second long side wall 172. The first and second short side walls 173 and 174 may extend in a second direction (or the x-axis direction) and the first and second long side walls 171 and 172 may extend in a third direction (e.g., a y-axis direction), wherein the second direction and the third direction intersect with each other. The first and second long side walls 171 and 172 are formed relatively longer than the first and second short side walls 173 and 174. The first long side wall 171 has a terminal opening H (e.g., a terminal hole) formed therein for mounting the electrode terminal 21.

When the electrode assembly 10 is inserted into the case 15, the case 15 and the positive electrode 11 are electrically connected to each other. For example, the positive electrode 11 may be directly electrically connected to an inside surface of the first long side wall 171. The electrode assembly 10 is housed in the case 15 such that the flat portion of the electrode assembly 10 faces the bottom 16. Accordingly, the spiral-wound end portions of the electrode assembly 10 face the first and second short side walls 173 and 174.

The first long side wall 171 of the case 15 has at least one opening, for example, the first long side wall 171 may have an electrolyte injection opening 29 and a vent hole 24. The electrolyte injection opening 29 enables injection of an electrolyte into the case 15 after coupling and welding a cover 20 to the case 15. After injecting the electrolyte, the electrolyte injection opening 29 is closed with a sealing plug 27.

The vent hole 24 is closed with a vent plate 26. The vent hole 24 may be used to discharge a gas generated in the rechargeable battery 1 during charging and discharging of the electrode assembly 10, as well as release (or discharge) an internal pressure caused by the gas.

If the internal pressure of the rechargeable battery 1 reaches a preset pressure, the vent plate 26 of the vent hole 24 is cut open to discharge the gas and reduce the internal pressure of the rechargeable battery 1. The vent plate 26 may have a notch for inducing the cut.

The cover 20 is mounted to the opening of the case 15 to tightly close the case 15. For example, the case 15 and the cover 20 made of aluminum may be welded together at the opening of the case.

The positive electrode 11 of the electrode assembly 10 may be electrically connected to the first long side wall 171 of the case 15 through a first lead tab 181 (also referred to herein as a positive electrode lead tab). For example, the positive electrode lead tab 181 may be directly connected to the inside surface of the first long side wall 171 by welding.

The first long side wall 171 may have a welding inducing portion 175 at an inside surface that protrudes toward the positive electrode lead tab 181, thereby enabling welding and connection to the positive electrode lead tab 181. Therefore, the case 15 and the cover 20 in the rechargeable battery 1 are each charged as a positive electrode. The case 15 thus functions as a positive electrode terminal.

The welding inducing portion 175 is formed inside a recessed portion of the first long side wall 171 of the case 15. For example, an outside of the welding inducing portion 175 forms a bus bar connection recess 176 to which one side of a bus bar 3 (See FIGS. 6 and 7) may be connected during assembly of a rechargeable battery pack 100.

The negative electrode 12 of the electrode assembly 10 is electrically connected to the electrode terminal 21 mounted in the terminal opening H in the first long side wall 171 through a second lead tab 182 (also referred to herein as a negative electrode lead tab). The electrode terminal 21 functions as a negative electrode terminal.

The electrode terminal 21 may include a plate terminal 21c arranged at the outside of the first long side wall 171 and corresponding to (or aligned with) the terminal opening H, and a rivet terminal 21a mounted to the first long side wall 171, the rivet terminal 21a passing through the terminal opening H and electrically connected to the electrode assembly 10 and fastened to the plate terminal 21c.

The plate terminal 21c has a through-hole H3 and the rivet terminal 21a passes through the terminal opening H and an upper portion of the rivet terminal 21a passes through the through-hole H3. The rivet terminal 21a includes a column portion 211 that extends through the terminal opening H in the first long side wall 171, and a flange portion 212 formed on one end of the column portion 211. The flange portion 212 is arranged (or aligned) at an inside of the first long side wall 171 and is formed to have a larger area than a cross-section of the column portion 211.

A gasket 36 is mounted between the column portion 211 of the rivet terminal 21a and an inside surface of the terminal opening H in the first long side wall 171 for sealing and electrically insulating the column portion 211 of the rivet terminal 21a and the terminal opening H in the first long side wall 171.

The gasket 36 extends between the flange portion 212 and the inside surface of the first long side wall 171 for sealing and electrically insulating the flange portion 212 from the first long side wall 171. As such, when the electrode terminal 21 is mounted to the first long side wall 171, the gasket 36 prevents the electrolyte from leaking through the terminal opening H.

The positive and negative electrode lead tabs 181 and 182 respectively electrically connect the first long side wall 171 and the electrode terminal 21 to the positive and negative electrodes 11 and 12 of the electrode assembly 10. That is, the positive and negative electrode lead tabs 181 and 182 are respectively connected to the first long side wall 171 and the rivet terminal 21a on one side, and are respectively connected to the uncoated portions 11b and 12b of the electrode assembly 10 by welding on the other side.

As the column portion 211 of the rivet terminal 21a is placed in a coupling hole 511 in the negative electrode lead tab 182, and the flange portion 212 supports the surroundings of the coupling hole 511, the rivet terminal 21a is electrically connected to the negative electrode lead tab 182. A periphery of the column portion 211 and the coupling hole 511 may be subjected to caulking or welding.

An insulating member 31 is placed between the plate terminal 21c and the first long side wall 171 for electrically insulating the plate terminal 21c from the first long side wall 171. That is, the first long side wall 171 and the case 15 are insulated from the electrode terminal 21.

The insulating member 31 and the plate terminal 21c are fastened to a top side of the rivet terminal 21a by riveting or welding, for example. The plate terminal 21c is mounted to an outside of the first long side wall 171 with the insulating member 31 interposed therebetween.

The following description refers to a rechargeable battery in accordance with a second embodiment of the present invention. Description of configurations that are identical to those of the first embodiment of the present invention may be omitted, and different configurations are primarily described below.

Figure 4:
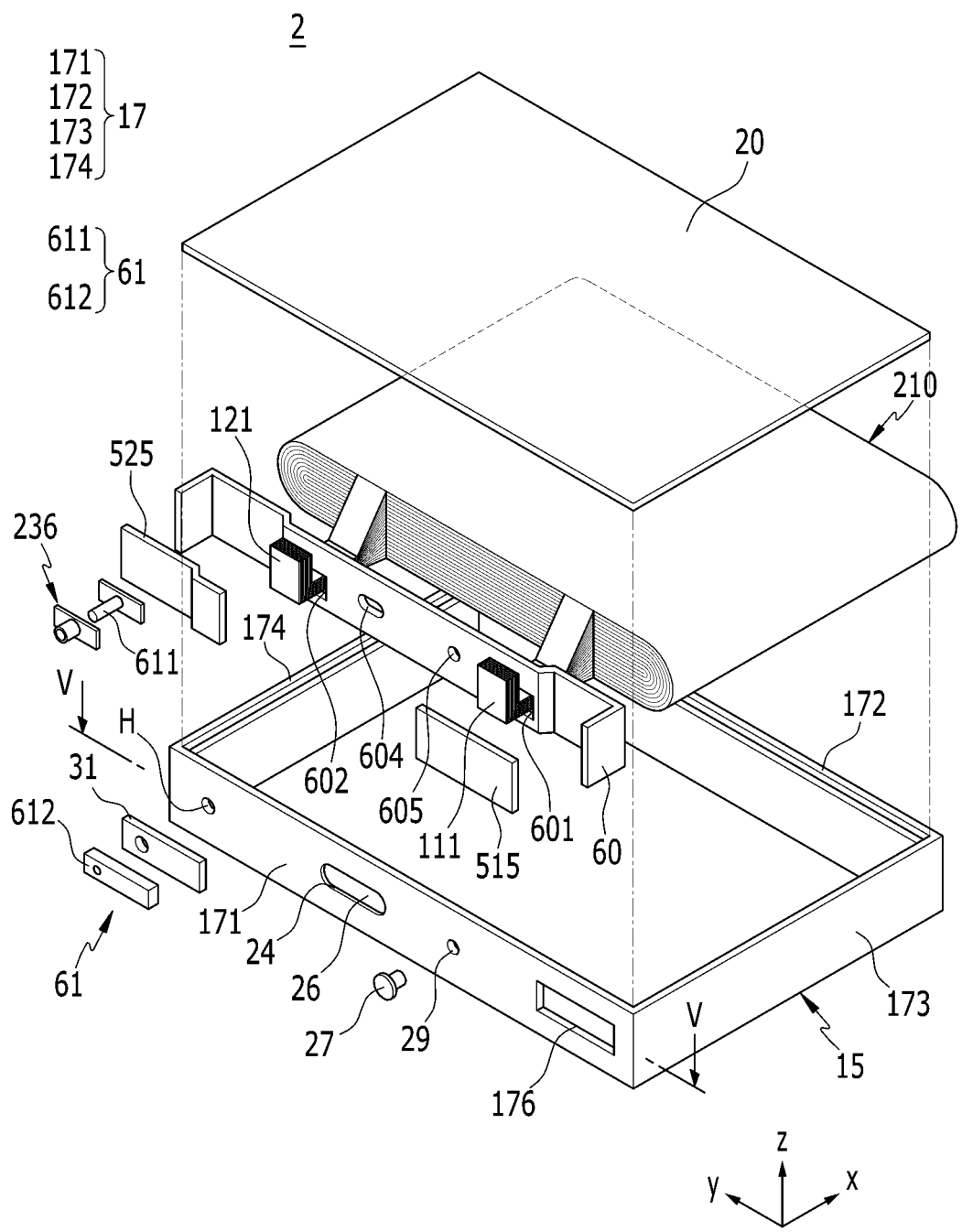
FIG. 4 is an exploded perspective view of a rechargeable battery in accordance with a second embodiment of the present invention.
Figure 5:
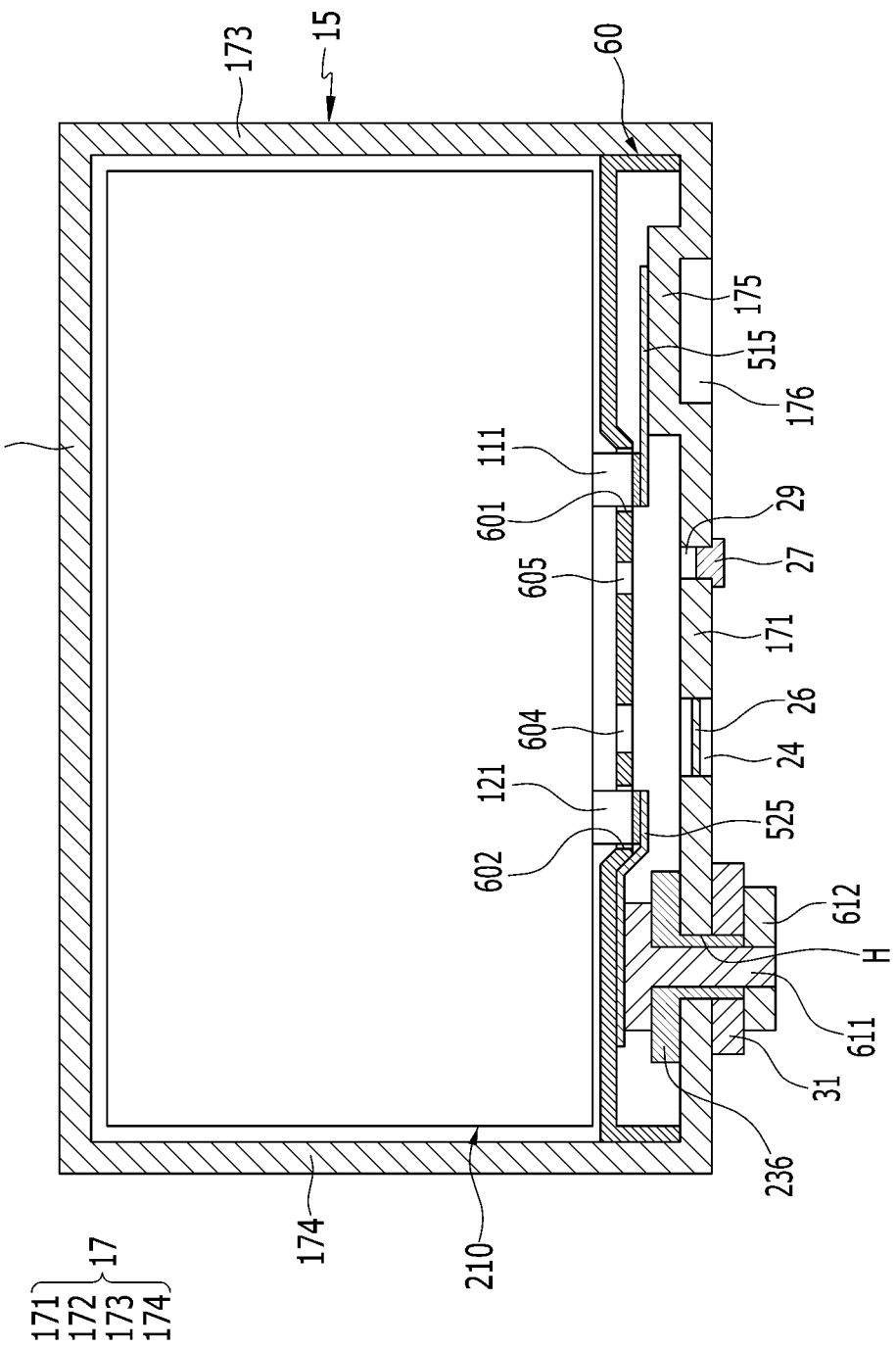
FIG. 5 is a cross-sectional view taken along the line V-V of FIG. 4.

FIG. 4 illustrates an exploded perspective view of a rechargeable battery in accordance with a second embodiment of the present invention, and FIG. 5 illustrates a cross-sectional view taken along the line V-V of FIG. 4. Referring to FIGS. 4 and 5, according to a second embodiment of the present invention, a rechargeable battery 2 has spirally-wound end portions of an electrode assembly 210 that face the first long side wall 171.

Even when the spiral-wound end portions of the electrode assembly 210 face the first long side wall 171, because the first plane (e.g., the x-y plane) of the electrode assembly 210 is aligned in the first direction (e.g., the z-axis direction), which intersects the wide opening of the case 15, placement of the electrode assembly 210 in the case 15 during assembly becomes easy.

In addition, the rechargeable battery 2 in accordance with the second embodiment of the present invention further includes an insulating plate 60 mounted between the first long side wall 171 and the electrode assembly 210. The insulating plate 60 is arranged on (or along) an inside surface of the first long side wall 171 for insulating the first long side wall 171 from the electrode assembly 210.

The insulating plate 60 has an internal vent hole 604 that corresponds to (or is aligned with) the vent hole 24 in the case 15. Because the internal vent hole 604 corresponds to the vent hole 24 in the first long side wall 171, the internal vent hole 604 may transmit internal pressure generated in the electrode assembly 210 to the vent hole 24 and discharge it therefrom.

The insulating plate 60 has an internal electrolyte injection opening 605 that corresponds to (or is aligned with) the electrolyte injection opening 29 in the case 15. Since the internal electrolyte injection opening 605 corresponds to the electrolyte injection opening 29 in the first long side wall 171, the electrolyte may be injected to the inside of the insulating plate 60 through the electrolyte injection opening 29.

The uncoated portions 111 and 121 of the electrode assembly 210 are housed in the case 15. The uncoated portion 111 is electrically connected to the first long side wall 171 via a through-hole 601 in the insulating plate 60, and the uncoated portion 121 is electrically connected to an electrode terminal 61 via a through-hole 602 in the insulating plate 60.

The uncoated portion 111 of the positive electrode is connected (e.g., welded) to an internal surface of the first long side wall 171 with a positive electrode lead tab 515 provided between the insulating plate 60 and the first long side wall 171. The uncoated portion 121 of the negative electrode 12 is connected to the electrode terminal 61 with a negative electrode lead tab 525 provided between the insulating plate 60 and the first long side wall 171.

The positive electrode lead tab 515 may be welded to the welding inducing portion 175 protruded from the inside wall of the first long side wall 171.

Therefore, in the rechargeable battery 2, the case 15 and the cover 20 are both charged as a positive electrode. The case 15 functions as a positive electrode terminal. The outside surface of the welding inducing portion 175 has a bus bar connection recess 176 that connects to one side of a bus bar during fabrication or assembly of the rechargeable battery pack.

The negative electrode lead tab 525 may be welded to a rivet terminal 611 of the electrode terminal 61 between the insulating plate 60 and the first long side wall 171 (i.e., the negative electrode tab 525 is between the rivet terminal 611 and the insulating plate 60, and the rivet terminal 611 is between the negative electrode tab 525 and the first long side wall 171). The rivet terminal 611 may extend through the terminal opening H and may be connected to a plate terminal 612. The electrode terminal 61 functions as a negative terminal. The insulating member 31 is interposed between the plate terminal 612 and the first long side wall 171, and a gasket 236 is interposed between the rivet terminal 611 and the terminal opening H.

The following description refers to a rechargeable battery pack having a rechargeable battery in accordance with one or more embodiments of the present invention. Descriptions of configurations that are identical to those of the rechargeable battery described above may be omitted.

Figure 6:
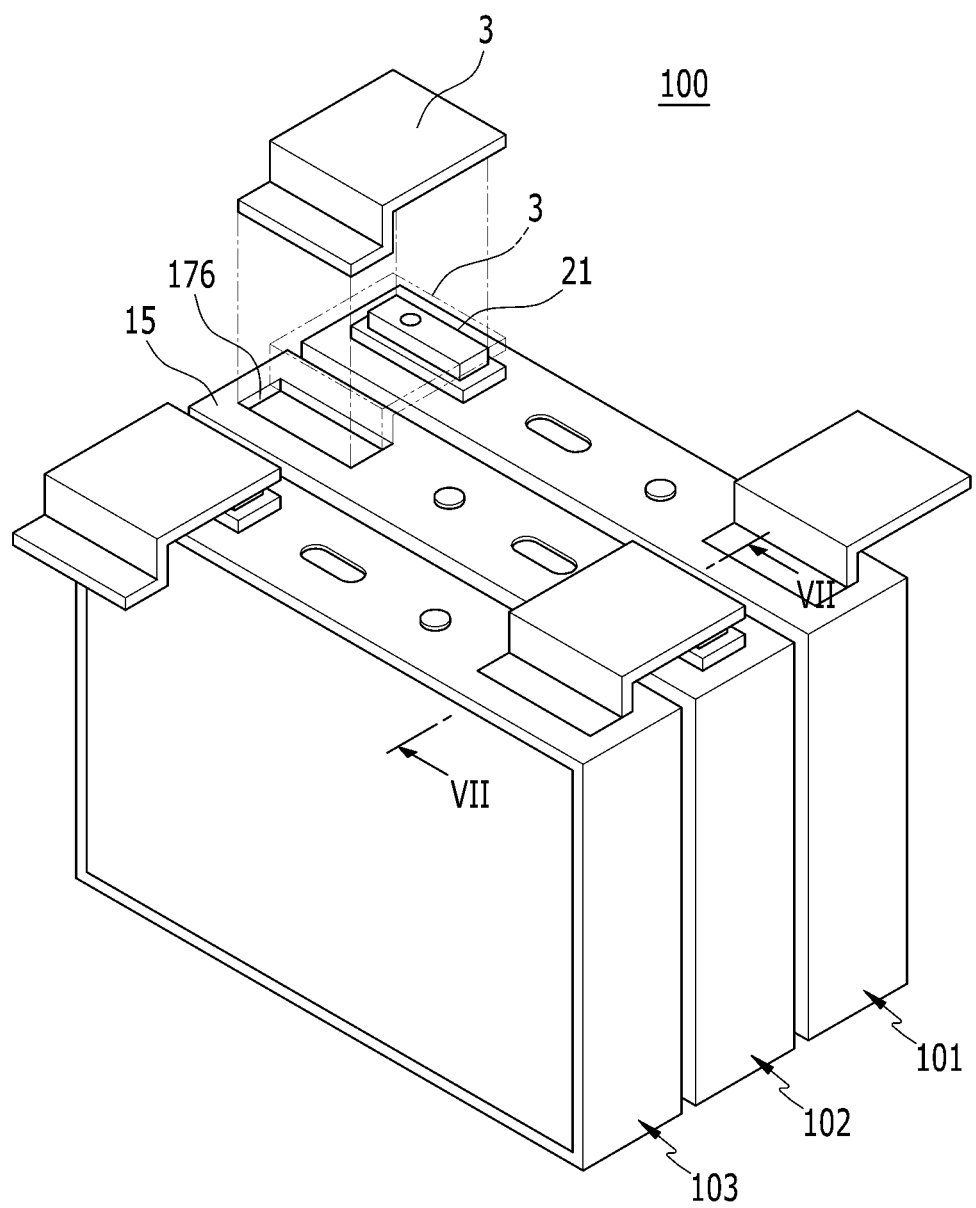
FIG. 6 is a perspective view of a rechargeable battery pack in accordance with a first embodiment of the present invention.
Figure 7:
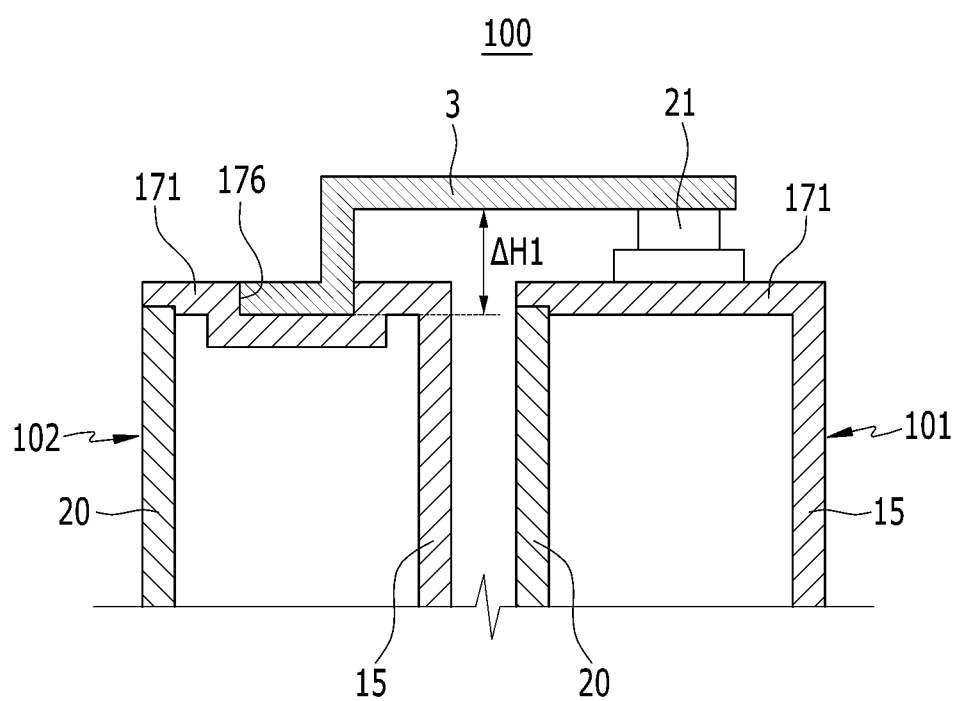
FIG. 7 is a cross-sectional view taken along the line VII-VII of FIG. 6.

FIG. 6 illustrates a perspective view of a rechargeable battery pack in accordance with a first embodiment of the present invention, and FIG. 7 illustrates a cross-sectional view taken along the line VII-VII of FIG. 6. For convenience of description, the rechargeable battery pack 100 is described as having the rechargeable battery 1 described above with reference to a first embodiment of the present invention. Referring to FIGS. 6 and 7, the rechargeable battery pack 100 may include a plurality of unit cells (e.g., a first unit cell 101, a second unit cell 102 and a third unit cell 103) and a bus bar 3 electrically connecting the first, second, and third unit cells 101, 102, and 103.

In one or more embodiments, a height difference ΔH1 may exist between the electrode terminal 21 of the first unit cell 101 and the case 15 of the second unit cell 102 (e.g., a height difference ΔH1 between the bus bar connection recess 176 and the outer surface of the electrode terminal 21 may be predetermined). The bus bar 3 may connect the electrode terminal 21 of the first unit cell 101 to the case 15 of the second unit cell 102 with the height difference ΔH1.

The bus bar 3 may be connected to the first long side wall 171 of the case 15, and may be bent to have the height difference ΔH1. The bus bar 3 is connected to the bus bar connection recess 176 that is recessed from the first long side wall 171 of the case 15 of the second unit cell 102.

For example, the bus bar 3 may have one end placed in and welded to the bus bar connection recess 176. Thus, by connecting bus bars 3 having the height difference ΔH1 to the electrode terminals 21 and the cases 15 of the first and second unit cells 101 and 102 adjacent to one another, the need to align the bus bars 3 is greatly reduced and pack assembly may become relatively easy.

Figure 8:
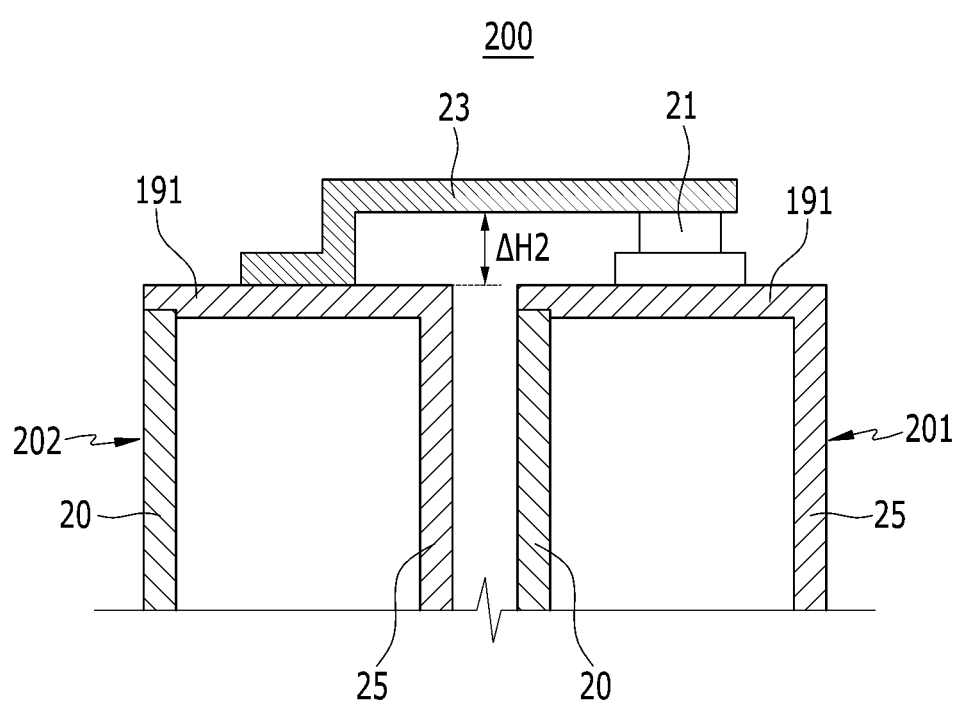
FIG. 8 is a cross-sectional view of a rechargeable battery pack in accordance with a second embodiment of the present invention.

FIG. 8 illustrates a cross-sectional view of a rechargeable battery pack in accordance with a second embodiment of the present invention. Referring to FIG. 8, in a rechargeable battery pack 200, a height difference ΔH2 may exist between the electrode terminal 21 of a first unit cell 201 and the case 25 of a second unit cell 202. A bus bar 23 may be connected between the electrode terminal 21 of the first unit cell 201 and the case 25 of the second unit cell 202 with the height difference ΔH2.

For example, the bus bar 23 may be welded to a first long side wall 191 of the case 25 and be bent to have the height difference ΔH2.

Although the rechargeable battery and the rechargeable battery pack in accordance with example embodiments of the present invention have been described, the present invention is not limited thereto, and variations and modifications are possible within the scope of the claims, detailed description of the present invention, and accompanying drawings.

While this invention has been described in connection with what is presently considered to be some practical exemplary embodiments, it is to be understood that the invention is not limited to the disclosed embodiments, but, on the contrary, is intended to cover various modifications and equivalent arrangements included within the spirit and scope of the appended claims and their embodiments.

DESCRIPTION OF SOME OF THE REFERENCE SYMBOLS 1, 2: rechargeable battery
3, 23: bus bar
10, 210: electrode assembly
11: first electrode (positive electrode)
11a, 12a: coated portion
11b, 12b, 111, 121: uncoated portion
12: second electrode (negative electrode)
15, 25: case
16: bottom
17: side wall
20: cover
21, 61: electrode terminal
21a, 611: rivet terminal
21c, 612: plate terminal
24: vent hole
26: vent plate
27: seal plug
29: electrolyte injection opening
31: insulating member
36: gasket
60: insulating plate
100, 200: rechargeable battery pack
101, 102, 103: first, second, and third unit cells
171, 191: first long side wall
172: second long side wall
173, 174: first and second short side walls
175: welding inducing portion
176: bus bar connection recess
181, 515: first lead tab (positive electrode lead tab)
182, 525: second lead tab (negative electrode lead tab)
211: column portion
212: flange portion
601, 602: pass through opening
604: inside vent hole
605: internal electrolyte injection opening
H: terminal opening
H3: through-hole
ΔH1, ΔH2: height difference

What is claimed is:

1. A rechargeable battery pack comprising:
a plurality of unit cells, each one of the unit cells having an electrode assembly with a first electrode electrically connected to a case, the case having an opening in a plane parallel to a flat side surface of the electrode assembly, and a second electrode electrically connected to an electrode terminal, the electrode terminal extending away from the case and insulated from the case; and
a bus bar connected between the electrode terminal of a first unit cell of the unit cells and the case of a second unit cell of the unit cells with the electrode terminal of the first unit cell having a height that is different from a height of the case of the second unit cell, wherein the bus bar includes a first raised portion and a second portion bent away from the first raised portion, wherein the first raised portion is connected to the electrode terminal of the first unit cell, and the second portion is directly connected to a wall of the case of the second unit cell,
wherein the wall protrudes inward towards an interior of the second unit cell and generates a bus bar connection recess on an exterior of the wall, wherein the second portion of the bus bar is connected to the bus bar connection recess.

2. The rechargeable battery pack of claim 1, wherein the case of at least the second unit cell comprises a first long side wall, a second long side wall, a first short side wall and a second short side wall, the first long side wall, the second long side wall, the first short side wall, and the second short side wall each connected to a bottom of the case, thereby forming the opening, the opening being opposite to the bottom, wherein the second portion of the bus bar is connected to the first long side wall of the case of the second unit cell.

3. The rechargeable battery pack of claim 2, wherein the bus bar connection recess is located on an exterior of the first long side wall.

4. The rechargeable battery pack of claim 2, wherein the second portion of the bus bar is connected to the first long side wall of the case of the second unit cell by welding.

* * * * *